United States Patent [19]
Higginson et al.

[11] 3,885,453
[45] May 27, 1975

[54] REGULATION OF TRAVERSING MOVEMENT OF TARGET ALIGNMENT APPARATUS

[75] Inventors: Howard P. Higginson; Robert P. Mack, both of Los Angeles, Calif.

[73] Assignee: Hughes Aircraft Company, Culver City, Calif.

[22] Filed: July 24, 1972

[21] Appl. No.: 274,528

Related U.S. Application Data

[62] Division of Ser. No. 48,787, June 19, 1970, abandoned.

[52] U.S. Cl. .................................................. 89/37 H
[51] Int. Cl. ............................................ F41f 21/06
[58] Field of Search .............. 89/1.802, 1.815, 37 B, 89/37 E, 37 H, 40 E, 41 R; 102/3; 188/268, 266, 276; 244/3.1, 3.11, 3.12, 3.13, 3.14; 33/344, 364; 248/183; 308/35

[56] References Cited
UNITED STATES PATENTS

| | | | |
|---|---|---|---|
| 2,604,163 | 7/1952 | Exline | 188/276 |
| 2,775,317 | 12/1956 | Sinisterra | 188/268 |
| 2,965,200 | 12/1960 | Pribonic | 188/266 |
| 2,971,437 | 2/1961 | Surtees | 244/3.11 |
| 2,998,868 | 9/1961 | Meier | 188/266 |
| 3,069,783 | 12/1962 | Dinsmore | 33/364 |
| 3,123,330 | 3/1964 | Forbes et al. | 248/183 |
| 3,180,603 | 4/1965 | O'Connor | 188/266 |
| 3,236,153 | 2/1966 | Newcomb | 89/1.815 |
| 3,241,642 | 3/1966 | King | 188/268 |
| 3,389,637 | 6/1968 | Beler et al. | 89/1.815 |
| 3,489,087 | 1/1970 | Soderberg | 102/81 |
| 3,552,699 | 1/1971 | Baker | 248/183 |
| 3,568,328 | 3/1971 | Sharpe | 33/344 |

FOREIGN PATENTS OR APPLICATIONS

794,301  4/1958  United Kingdom................. 188/268

OTHER PUBLICATIONS

Laurence W. Spooner, "Silicone Putty As An Engineering Material," Product Engineering, Jan. 1950, pp. 90-93.

*Primary Examiner*—Stephen C. Bentley
*Attorney, Agent, or Firm*—Richard J. Rengel; W. H. MacAllister

[57] ABSTRACT

Fluid dampers having a predetermined non-linear torque/velocity characteristic are provided for azimuth and elevation axes of a traversing unit for a missile launcher. Each fluid damper comprises a pair of coaxially-aligned, truncated cones formed from metals of different temperature coefficients which regulate the spacing between opposing surfaces of the cones and the thickness of a highly viscous fluid (dimethyl polysiloxane) therebetween to maintain a selected non-linear torque/velocity relationship which provides for limiting of the resistance to torque for rapid slewing to a different sector (target acquisition) while maintaining optimal or critical damping required to prevent overshoot and wavering during tracking of a target throughout the flight of a launched missile.

11 Claims, 5 Drawing Figures

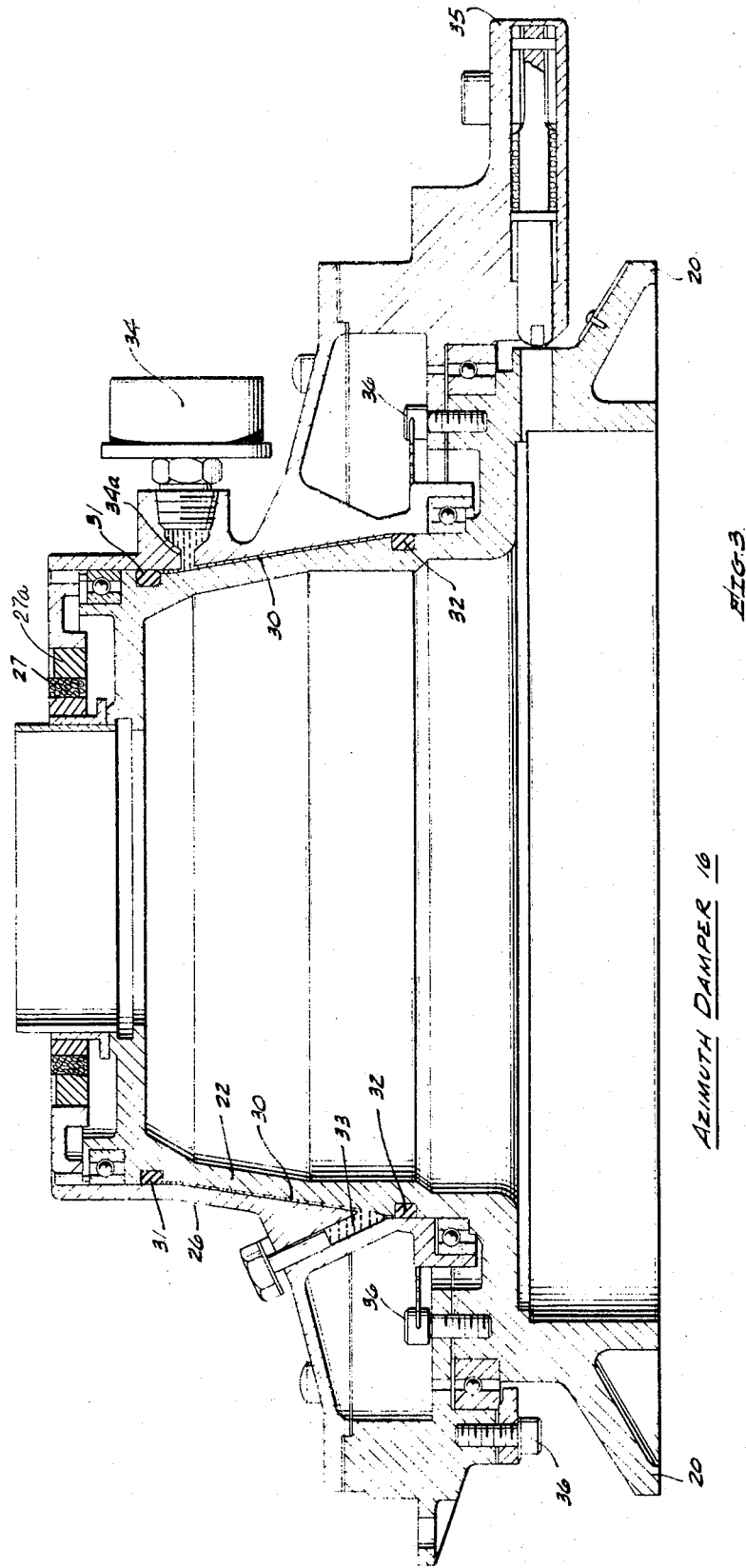

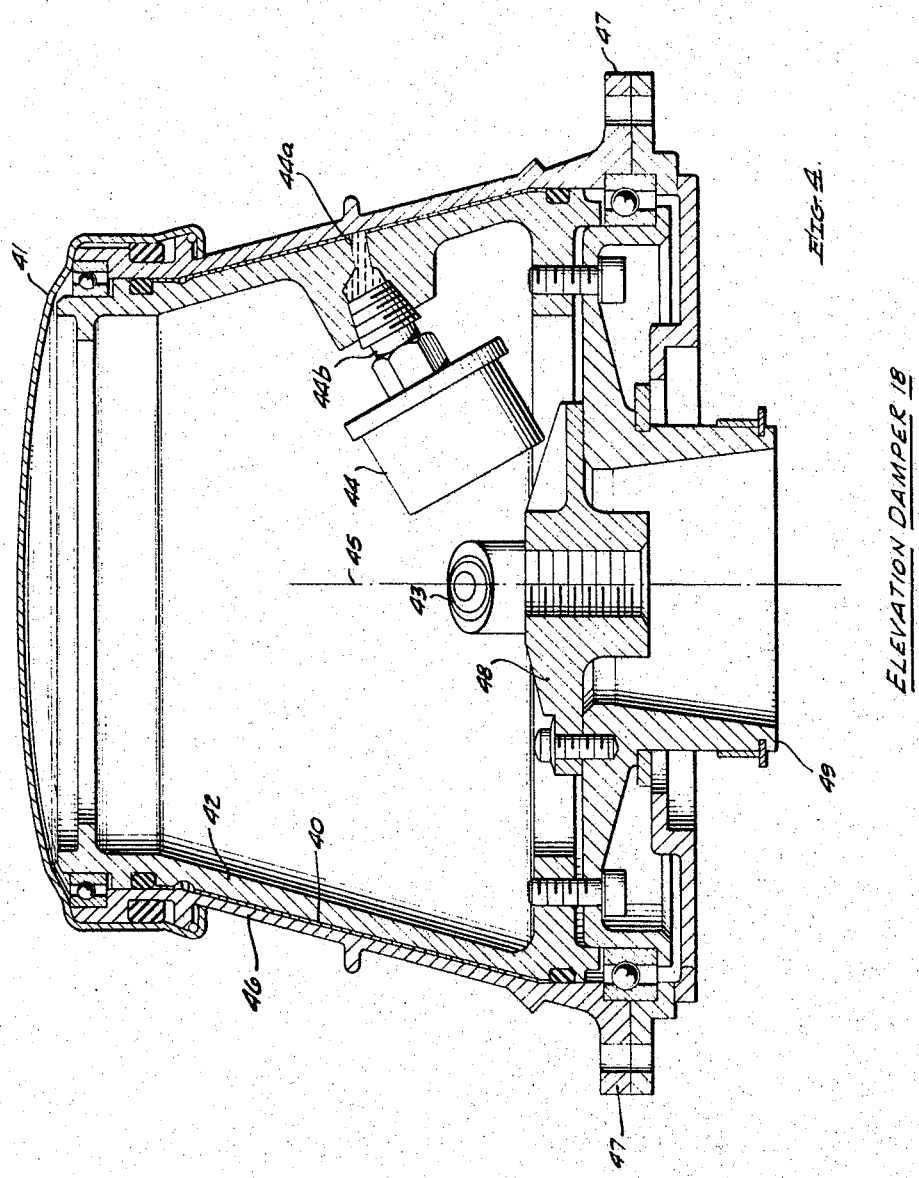

REGULATION OF TRAVERSING MOVEMENT OF TARGET ALIGNMENT APPARATUS

The invention herein described was made in the course of or under a contract or subcontract thereunder (or grant) with the Department of the Army.

This is a division of copending application Ser. No. 48,787 filed June 19, 1970, now abandoned in favor of continuation application Ser. No. 343,780, filed Mar. 22, 1973.

BACKGROUND OF THE INVENTION

In various equipment requiring sighting of objects, substantial damping is required to eliminate waver and overshoot and thereby maintain the equipment sighted directly on target or other object. In weapon systems, such as a portable missile launcher having controlled guidance, optical tracking of the target is provided for throughout the flight of the missile. Accordingly, it is important to regulate sighting and tracking movements to eliminate waver of a human operator, for example, in order to maintain a true flight path throughout the flight of the missile. Damping in both azimuth and elevation axes of traversing units of weapon systems and other equipment, such as television and motion picture cameras, eliminates waver during tracking and aiming. In guided missile systems, however, it is more important to avoid transmission of, and response to, control signals due to waver to eliminate resulting deviations in the missile flight path, particularly near the time of impact when deviations due to waver can direct the missile past the target. For example, guidance control signals in response to the waver of a human operator, typically .6 cycle per second, is capable of causing deviation in the flight of the missile being guided such that a moving vehicle at a distance of only 50 feet could not be accuratley tracked to score a hit; or a stationary target could not be hit at a distance of only 1000 yards.

While substantial damping at low traverse rates has been found to be necessary for sighting of this type of equipment, the system is encumbered by an increasing high resistance to motion so as to effectively limit the traverse rates. During target acquisition, when rapis slewing about either or both axes is either desirable or required in operation, the damping system must be disengaged or an override provided to limit linearly increasing resistance of fluid medium dampers (Newtonian) and the torque required at the higher traverse rates. The present invention overcomes the foregoing and provides other features and advantages by regulated non-linear damping for optimal and critical damping in the lower range of traverse rates for tracking and sighting while limiting the resistance to torque to facilitate tracking at faster rates and permitting rapid slewing as often required during target acquisition.

More particularly, in prior weapons sytems of the portable missile launcher type having controlled guidance and optical tracking of the target throughout the flight of the missile, undesirable expedients have been employed to avoid the problem encountered in providing of substantial damping to eliminate waver and overshoot to maintain the equipment cited directly on the target or other object. The automatic missile guidance system for guiding a missile along the line of sight to a target established by human operator comprises a guidance unit including a radiant energy receiver adapted to receive radiated energy from the missile and forming guidance signals related to the deviation of the missile from the line of sight established by the operator by the optical tracking manually position optical tracker. In U.S. Pat. No. 3,233,847 issued to A. Girsberger on Feb. 8, 1966 which is incorporated by reference herein, a system is disclosed of the aforementioned type and which provides for elimination of trembling movements of the operator as he manipulates the controls. The expedients suggested by this patent was to provide mechanical drag springs, highly viscous fluids or eddy current brake with a highly damping action, or a low pass filter which could be incorporated in the electrical transmission channel for elimination of signals in the undesired frequency range. As noted therein, this has the undesirable feature of eliminating large and rapid movements of hand controls into corresponding rapid changes in the course of the missile which are often times necessary. In order to provide for rapid changes in the course of the missile, a system of this prior patent discloses switches and circuits for combining signals to provide for rapid changes during certain intervals in the flight of the missile. Accordingly, a compromise has been selected in which only limited control of rapid changes is provided during the missile flight. The response time is so degraded by this arrangement that additional compensation is provided whenever rapid changes in direction are required. Accordingly, direct coupling with the hand controller is provided for introducing the higher frequency componenets in their entirety in the coupling between driving and driven shafts is an elastic entrainment wherein the movements of the driven shafts are damped. Other embodiments relied on a delay in the introduction of control movements of the hand controls, i.e. only after a time lag by use of drag springs which provide for retarding changes of azimuth in elevation components introduced by the hand controls.

The present invention overcomes the problems encounted in the system disclosed by this patent by providing regulation of traversing movements in which damping eliminates high frequency vibrations including trembling movements or human waver of the operator as he manipulates the controls but due to the apparent decrease in viscosity of the damper at high shear rates provides for rapid movements of the hand controls to provide corresponding rapid changes of the course of the missile. Critical damping for eliminating human trembling or waver is provided while avoiding the difficulties which would otherwise be encountered by linear increasing damping resistance of Newtonian fluids at slew and tracking rates, by non-linear damping in which limited damping resistance is provided by the substantial decrease in viscosity at the high viscosity of the (non-Newtonian) fluid to avoid the need for declutching or changing the damping area.

In U.S. Pat. No. 2,971,437, issued on Feb. 14, 1961, H. Surtees, a missile guidance system is disclosed in which a tachometer provides acceleration guidance signals for directing a missile in flight. Critical damping of the traversing movement of this system to eliminate human waver as provided by the present invention would overcome difficulties of erratic guidance due to waver of the operator at the controls.

SUMMARY OF THE INVENTION

The present invention is directed to non-linear damping of rotational movements about the axes of traversing assemblies of cameras, weapons, and the like to provide a high degree of damping at low rates of traversals to eliminate waver, jitter and overshoot while providing saturation characteristics for rapid slewing at high rates of traversal during target acquisition. In each of the dampers, a highly viscous fluid is disposed in a gap between opposing surfaces to induce shear stresses and resistance to relative motion. The proximity of these surfaces causes distortion of the fluid and resulting fluid friction therein due to shearing stresses. Suspensions and highly viscous fluids have a complicated response to distortion and the apparent viscosity decreases at higher shear rates which provides for linearly increasing resistance to motion at lower shear rates and limited resistance to motion at higher shear rates for rapid slewing. For example, an organic fluid, dimethyl polysiloxane of approximately 2 million centistokes viscosity, provides the desired linear increase in resistance for optimal or critical damping over the range of tracking rates and saturation in resistance to motion at higher rates of traverse. As a result of this saturation, the torque required at higher rates of traverse for rapid slewing is limited whereby the advantage of optimal or critical damping in the lower range of traversal rates is preserved while allowing for rapid slewing as either desirable or necessary for operation.

Regulation of the torque/velocity characteristic of the dampers of the present invention is provided by controlling the gap or spacing between opposing cone surfaces and thereby varying the thickness of the fluid to compensate for variations in viscosity of the fluid due to temperature variations. This is important to successful and continuous operation of the equipment since the highly viscous fluid cannot be substituted readily to provide the desired viscosity nor can the gap width be quickly changed to obtain optimal damping. Compensation for viscosity variations of 6 to 1 in the fluid in the operating range from −25°F to +115°F, for example, preserves the desired torque/velocity relationship including optimal or critical damping at the lower traversal rates.

Variation in gap over the range of ambient temperature changes is provided by an arrangement of inner and outer truncated cones of different coefficients of expansion in which the gap increases with decreasing temperatures, i.e. inversely, and at a rate of increase in the gap which maintains the linear damping at lower shear rates, and saturation at the higher shear rates for rapid slewing. Accordingly, it is an object of the present invention to provide a traversing unit for facilitating acquisition, tracking and aiming of equipment having the foregoing features and advantages.

Another object is the provision of non-linear fluid damping for matching the torque/velocity relationship to the different modes of operation of the equipment.

A further object is to provide a linear increase in resistance to torque with an increase in relative motion in the lower range of traversal rates and saturation in resistance to torque at higher rates of traversal for fast tracking and slewing.

Still another object is the provision of a regulated fluid damper construction compensating for changes in viscosity of the damping fluid.

Other objects and features of the invention will become apparent to those skilled in the art as the disclosure is made in the invention.

BRIEF DESCRIPTION OF THE DRAWINGS

FIG. 3 is a cross sectional view of the azimuth damper assembly taken along the line 3—3 of FIG. 2;

FIG. 4 is a cross sectional view of the elevation damper assembly of the missile launcher shown in FIG. 1.

DESCRIPTION OF THE PREFERRED EMBODIMENT

Figure 1:
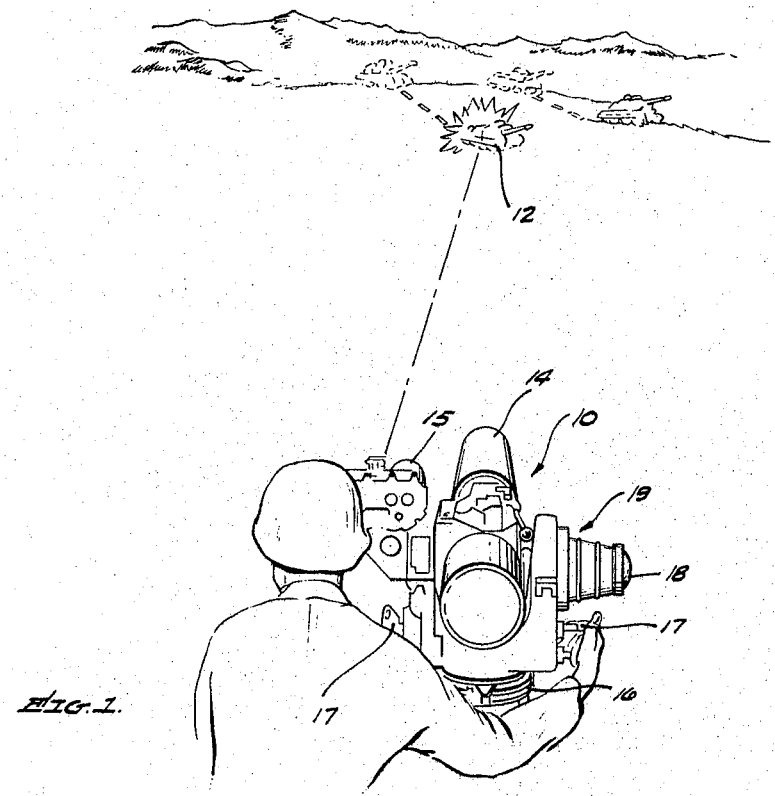
FIG. 1 is a pictorial view of a missile launcher having fluid dampers for azimuth and elevational axes of the traversal unit for illustrating the operation of the non-linear dampers of the present invention.
Figure 5:
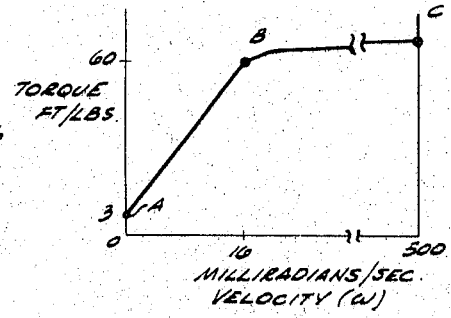
FIG. 5 is a graph illustrating a typical curve of the non-linear torque/velocity relationship for optimal damping of the preferred embodiment of the invention shown in FIGS. 2 and 3.

Referring now to FIG. 1 for a more detailed description of the preferred embodiment of the present invention, a portable assault weapon 10 is shown for launching missiles which are guided to a target 12 by optically tracking a moving target throughout the flight of the missile. As indicated, a moving target is acquired in tracking by an operator who applies a lateral force to traversing unit 19 to position a launch tube 14 in azimuth. Control knobs 17 are rotated to position the launch tube 14 in elevation to view the selected target through an optical sight 15 and to center cross hairs on the selected target. In accordance with the preferred embodiment, as illustrated, dampers 16 and 18 are provided on azimuth and elevation axes respectively of the traversing unit 19 for the missile launcher 10. Although the torque/velocity relationship for damping is non-linear, it should be noted that for tracking a target moving at a constant rate, the operator need only maintain a constant force on the traversing unit 19 to maintain the target in the optical sight 15. Having established a force level required, the operator then modulates about this level to compensate for small pointing errors. As indicated in FIG. 5 by the typical curve of the non-linear torque velocity relationship for the azimuth damper 16, the required torque to overcome the damping resistance is a function of relative velocity. The linear segment of the curve between points A and B is within the range of normal target tracking velocities from 0 to 16 milliradians per second where there is a high tracking accuracy requirement for the more distant targets. The slope of the linear portion of the curve is determined by matching to the operator's performance in maintaining adequate tracking requirements about the azimuth axis. Intermediate rates of 16 to 200 milliradians per second permit the operator to track, with reasonable accuracy, fast crossing, close-in targets. At higher traverse rates above 200 milliradians per second, which are experienced during target acquisition and intermediate tracking rates, the slope of the curve between points B and C illustrates the limiting of resistance of the damper 16 and torque required to provide for these tracking rates including rapid slewing of the missile launcher 10 to a new target sector. The limiting of the damping resistance above tracking rates of 16 milliradians per second is a direct result of the apparent decrease in viscosity of the highly viscous fluid (2 million centistokes) at the higher shear rates. In the lower range of tracking rates, the linear increase in torque is the expected characteristic of Newtonian fluids including viscous fluids which have appreciable fluid friction. The highly viscous fluid has a consistency of a semi-solid at 70°F, for example, and its flow characteristics are not readily evident because of the delay in flow.

Figure 2:
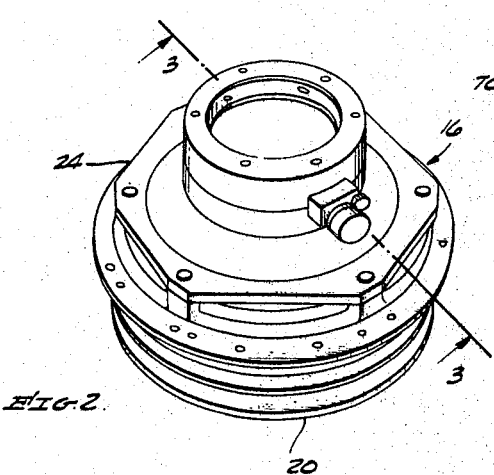
FIG. 2 is a perspective view of the azimuth damper assembly of the missile launcher shown in FIG. 1.

Referring now to FIGS. 2 and 3, for a detailed description of the azimuth damper assembly 16 of the missile launcher shown in FIG. 1, the traversing unit 19 shown in FIG. 1, is rotatably supported on a tripod or other mounting arrangement by the azimuth damper 16 shown in FIG. 2. The lower flange 20 of damper 16 is attached to the tripod and is integral with the inner truncated cone 22 of the damper assembly 16, as shown more clearly in FIG. 3. Outer housing 24, including outer truncated cone 26, is supported for rotation on the inner cone 22 to provide for a movement of the missile launcher about the azimuth axis. A tachometer including annular members (27, 27a) is seated in an annular cavity 27 and attached to inner and outer cone sections to provide rate signals for controlling the guidance of launched missiles. In addition to providing traversing damping, the azimuth damper also provides extremely high radial damping between the stator 27a and the rotor 27 of a DC generator type of tachometer.

In FIG. 3, the highly viscous damping fluid 30 is indicated by section lines between inner and outer cones 22 and 26. The damping fluid 30 is retained between opposing annular sections of these cones by annular seals 31 and 32. The inner and outer cones 22 and 26 are formed of materials having different coefficients of expansion to provide space between sections that will increase inversely with temperature, i.e. the thickness of the annular gap dimension is increased to compensate for increased viscosity of the damping fluid 30 at lower temperatures and vice versa. For example, the outer cone 26 is formed of titanium having a smaller coefficient of expansion than the inner cone formed of aluminum to provide for increasing the thickness of the gap between inner and outer cones as the ambient temperature decreases and viscosity of the fluid 30 increases, for example. Since the volume of fluid between inner and outer cones varies with the thickness of the annular gap, a relative excess of damping fluid 30 is stored, or deficiency of damping fluid 30 in the gap is supplied from a bellows reservoir 34. As required therefore, each of the dampers 16 and 18 has a bellows reservoir which is capable of supplying damping fluid as required to maintain the annular space or gap filled between opposing annular sections of inner and outer cones 22 and 26. This compensation for viscosity changes of the damping fluid 30 over an ambient temperature range of 140°F (−25°F to +115°F) maintains the torque/velocity relationship within the desired tolerances, i.e. the curve shown in FIG. 2 is for room temperature (approximately 70°F) and may shift slightly over the temperature range but the torque required at any given velocity remains within the desired tolerances.

Referring to FIG. 4, the elevation damper 18, similar in operation to the azimuth damper 16 in that the desirable damping features are provided, is shown in cross section and includes an inner aluminum cone 42 and an outer titanium cone 46 providing an annular gap for a highly viscous fluid 40. In the elevation damper 18, the inner cone 42 is rotatable about the elevation axis 45 with the launch tube 14 (FIG. 1). The outer cone 46 is secured to the bifurcated housing of the traversing unit 19. The elevation damper 18 is secured to the traversing unit 19 by suitable fastening means passing through annular flanges 47 projecting radially from one end of the outer cone 46. The inner cone 42, which is supported for rotation about the elevation axis and within the outer cone 46 by annular bearings 47a and 47b as shown, is coupled to a pinion of the launch tube 14 and rotatable therewith. As shown in FIG. 4, the inner cone 42 is attached to coaxially disposed, annular coupling members 48 and 49 which are secured to the pinion extending from the side of the launch tube 14 to be secured in the central openings thereof. The opposite end of the damper 18 is enclosed by a protective cover 41 which is removable to provide access to the damper interior including viscous fluid outlet 43 and bellows reservoir 44. The outlet 43 is sealed by a suitable threaded plug seated in an interior channel leading to the annular gap between cones. The reservoir 44 supplies viscous fluid 40 to the annular gap through an interior channel 44a which communicates with fluid stored in a reservoir 44 through a threaded tubular coupling 44b. In FIG. 3, corresponding inlet and outlet channels 33 and 34a are shown for supplying viscous fluid to the annular gap of the azimuth damper 16. In addition, azimuth damper 16 has provision for passing cables axially through the damper and a locking mechanism 35 for locking the traverse unit 19 securing it from rotation about the azimuth axis.

As noted earlier, two of the factors affect the relationship between torque and velocity illustrated by a typical characteristic curve in FIG. 5, namely, the annular gap thickness or spacing between inner and outer cones and the viscosity of the highly viscous fluid. Assuming the typical damping fluid viscosity to be 2.0 million centistokes, at approximately 70°F, a spacing of approximately 3.6 mils between inner and outer cones, either damper 16 or 18 will provide the non-linear torque velocity relationship to the extent necessary to meet performance requirements of the system. In assembly of the azimuth damper 16 shown in FIG. 3, the gap between inner and outer cones 22 and 26 is adjusted to approximately 3.6 mils by insertion of spacers between opposing joining surfaces secured by tap screws 36. The thickness of the spacer positions the inner and outer cones 22 and 26 relative to one another along their common axis to more precisely set the thickness of the annular gap between these cones. The elevation damper 18, shown in FIG. 4, provides for adjustment of relative position of the inner cone 42 and outer cone 46 by the placement of spacers between opposing surfaces of the peripheral flanges 47.

After assembly of the damper 16 and setting of the gap to the proper thickness, as shown in FIG. 3, the highly viscous damping fluid 30 is forced into the gap by supplying the fluid to inlet channel 34a and producing differential pressure between the inlet 34a and outlet 33. The elevation damper 18 of FIG. 4 provides for filling the gap 42 with damping fluid 40 by inlet 44a and outlet 43. The opposing surfaces of the inner and outer cones of the respective dampers are wetted by the damping fluid to produce shear stresses in the fluid upon relative rotation thereof.

As noted earlier, the thickness of the gap of either damper is varied by the lower coefficient of expansion of the outer cone relative to the inner cone to compensate for temperature/viscosity variations. For example, the differential in coefficients of expansion of titanium and aluminum is approximately $7.5 \times 10^{-6}$ which provides the desired variation in gap thickness to maintain the torque/velocity relationship within performance tolerance requirements. More specifically, the gap thickness is set at 3.6 mils at the temperature of 70°F and due to the difference in coefficients of expansion of titanium and aluminum the gap is increased in thickness to 4.36 mils at −25°F and decreased in thickness to 2.6 mils at 125°F.

Critical damping is provided in the elevation damper 18 by increasing the surface areas of the cones 42 and 46. The need for this exists because the path of the launched missile is near the earth's surface and any slight deviation due to the operator's waver, jitter or overshoot in tracking or aiming could direct the launched missile into the ground. In order that the operator be capable of supplying the larger torque required for the critical damping, the control knobs for rotating the launch tube 14 about the elevation axis provide a 5 to 1 mechanical ratio by a multiple chain drive coupling the control knobs to the pinions of the launch tube 14. The multiple chain drive is disposed inside the traversing unit 19 and provides a coupling which eliminates backlash found in other coupling means such as gear train, or compliance found in anti-backlash gear trains or cable couplings. The foregoing illustrates the degree of criticality of the guidance of the missile launcher and features and advantages of the damper of the preferred embodiment of the present invention in providing the required non-linear damping about the azimuth and elevation axes.

In light of the above teachings of the preferred embodiments disclosed, various modifications and variations of the present invention are contemplated and will be apparent to those skilled in the art without departing from the spirit and scope of the invention.

What is claimed is:

1. In combination, non-Newtonian damped traversing unit and sighting means disposed on said traversing unit for locating and tracking objects;

pivot means providing at least two degrees of movement about azimuth and elevation axes for traversing operations about said axes including movement over a range of traversing rates during operation of the traversing unit;

fluid damper means for respective axes coupled to said pivot means for producing non-linear dampening of said movement about said axes over the range of traversing rates;

said damper means comprising annular sections having spaced, opposing annular surfaces defining a gap and disposed for relative movement including one of said sections which is coupled to said pivot means to be movable therewith to produce relative movement at a rate which is a function of said traversing rates;

said damper means including a highly viscous fluid disposed in the gap between said sections and engaging the opposing surfaces of the damper to produce shear in said fluid in the range of traverse rates for damping resistance to relative movement, said highly viscous fluid at the desired high viscosity and in the range of traversing rates exhibiting a non-Newtonian characteristic including repeatedly exhibiting a substantial reduction in apparent viscosity in the intermediate and higher traversing rates of the range of each traversing operation exceeding predetermined rates of shear to limit the damping resistance wherein the degree of said reduction is apparent viscosity and limiting of damping resistance is determined by the non-Newtonian characteristic of the fluid at the desired high viscosity thereof, said damper means being constructed and arranged to utilize the substantial reduction in apparent viscosity provided by the non-Newtonian characteristic of the highly viscous fluid in the gap by producing relative movement of said opposing surfaces including relative movement below and above said predetermined shear rates within the range of traversing rates of the traversing unit to produce non-linearity in damping resistance while maintaining a stable area of fluid contact with the opposing annular surfaces of the sections forming the gap for producing a substantial decreasing rate of damping resistance to higher rates of movement producing relative movement of said opposing surfaces above said predetermined shear rates in the upper range of traversing rates in the operation of said unit wherein said fluid is made responsive to relative movement of said annular sections in the range of shear rates to produce shear stresses in the fluid for non-linear damping resistance over the range of traversing rates for damping of movement of said pivot means about said axis as a function of rate of movement so that the resistance to movement is substantially limited to below a predetermined torque applied to said pivot means for facilitating relative movement exceeding a predetermined desired traversing rate in said range while maintaining damping resistance below said predetermined desired traversing rate for substantial damping of movement of the traversing unit in the lower range of operation thereof.

2. The traversing unit according to claim 1 in which said highly viscous fluid is dimethyl polysiloxane.

3. The traversing unit according to claim 1 in which said fluid has a viscosity of approximately in the range of one to six million centistokes, the fluid damper means for said azimuth axis is constructed and arranged to be coupled to said pivot means so that the torque required for producing relative movement about the azimuth axis varies linearly approximately on the order of 3 to 60 foot pounds for traversing rates approximately on the order of 0 to 16 milliradians per second and the torque is limited to approximately 60 foot pounds for higher traversing rates in the range of traversing rates.

4. The traversing unit according to claim 1 in which the surfaces of said damper means for said azimuth axis, are disposed in close proximity and movement of the pivot means about the azimuth axis is coupled to the damper means so that relative movement of said surfaces produces shear stresses in said viscous fluid to provide a non-linear torque-velocity relationship over the range of traversing rates in the operation of the traversing unit including linearly increasing damping resistance at lower traversing rates and said fluid provides non-linear damping in response to linearly increasing friction produced in the fluid filled gap saturating at intermediate shear rates in response to relative movement of said opposing surfaces corresponding to intermediate traversing rates to substantially limit the damping resistance above said intermediate traversing rates.

5. The traversing unit according to claim 1 in which relative movement of said opposing surfaces of said damper means for said azimuth axis is produced in response to torque applied to said traversing unit about said axis and transmitted to at least one of said annular sections and the gap is filled with fluid and means are provided to maintain the gap filled with fluid so that the fluid in the gap is made solely responsive to the rate of relative movement of said surfaces over the range of traversing rates of the unit to provide a damping resistance which is non-linear over the operational range of rates of relative movement of said opposing surfaces including linear damping resistance in the region of lower traversing rates to provide substantial damping resistance to all relative movements at lower traversing rates and limited damping resistance to movement at intermediate and higher traversing rates.

6. The traversing unit according to claim 1 in which the non-linearity in shear resistance of the damper means is matched to the torque capabilities of a human operator of the traversing unit, said traversing unit including means for coupling manual movements of the operator to produce movement about at least one transverse axis.

7. The traversing unit according to claim 1 in which the area of opposing surfaces of annular sections for damping about the elevation axis in substantially larger than the area of opposing surfaces of the annular sections for the azimuth axis to provide substantially greater damping resistance at lower traversing rates of relative movement of the annular sections for the elevation axis for critical damping about the elevation axis.

8. In combination, sighting means for locating and tracking objects disposed on a traversing unit having a plurality of non-linear fluid dampers including dampers for azimuth and elevation axes, each of said dampers comprising:

damper surfaces disposed in opposing relationship to provide a gap between said surfaces;

means for supporting said damper surfaces for relative movement in a predetermined range of operational rates; and a highly viscous fluid disposed in said gap for fully engaging the opposing damper surfaces over the range of operational rates, said fluid having a non-Newtonian characteristic including a non-linear region exhibiting a substantial apparent decrease in viscosity above predetermined shear rates in the range of operation at the high viscosity of the fluid, said damper surfaces being disposed and arranged to move in said range of operational rates and in close proximity so that shearing stresses are produced in the fluid causing said substantial apparent decrease in viscosity at higher rates of relative movement in the range of operational rates of the damper, said damper being responsive to relative movement of said damper surfaces to provide a predetermined substantial decrease in rate of increase in damping resistance to said movement at higher operational rates of relative movement of the damper surfaces as a result of a decrease in apparent viscosity of said fluid in the fluid fully engaging the opposing damper surfaces to substantially limit the dampening resistance below a predetermined amount for higher operational rates of movement within said range of operational rates of the damper.

9. The non-linear dampers according to claim 8 in which said fluid fills the gap and is maintained filled to fully engage the opposing damper surfaces over the range of operation of the damper and the fluid is semi-solid in consistency having a non-Newtonian characteristic in the range of shear rates of operation of the damper so that the resistance of the damper is substantially limited in the non-linear region of the characteristic solely as a result of shear stresses in the fluid in the fluid filled gap.

10. The non-linear dampers according to claim 8 in which said fluid comprises dimethyl polysiloxane having a viscosity in the range of 1 to 6 million centistokes.

11. In combination, traversing unit having a plurality of damper units for traversing about azimuth and elevation axes and sighting means disposed on said traversing unit for locating and tracking objects, each damper unit consisting of two parts which can be moved relative to each other and having mutually opposing surfaces which define a narrow space containing a damping medium of high viscosity; said damper being characterized by the damping medium having a non-Newtonian frictional resistance in response to shear forces produced in the damping medium in the narrow space such that the resistance impeding relative movement of said two parts reaches a threshold value at higher speeds of relative movement; and wherein the area of mutually opposing surfaces of the damping unit which can be turned relative to each other is considerably larger for the elevation axis than the area of the mutually opposing surfaces of the parts which can be turned in relation to each other of the unit for the azimuth axis.

* * * * *